June 19, 1962 R. TERLECKI ET AL 3,040,129

TESTING OF BINARY APPARATUS

Filed May 19, 1958

INVENTORS
Renat Terlecki
John W. Bailey
BY
Ralph B. Stewart
ATTORNEY

3,040,129
TESTING OF BINARY APPARATUS

Renat Terlecki, Buckinghamshire, and John W. Bailey, London, England, assignors to British Telecommunications Research Limited, Taplow, England Filed May 19, 1958, Ser. No. 736,363
Claims priority, application Great Britain May 22, 1957
2 Claims. (Cl. 178—69)

The present invention relates to the testing of binary apparatus that is, apparatus which takes up two conditions alternately in response to the application thereto of binary signals. An example of such apparatus is a telegraph relay.

It is sometimes required to ascertain, in the operation of a telegraph relay, the level of the signal at which the relay tongue changes over during a transition from mark to space or vice versa.

It is an object of the present invention to provide an improved method whereby the aforesaid requirement can be met.

It is another object of the invention to provide improved apparatus whereby the aforesaid requirement can be met.

According to the present invention a method of testing binary apparatus comprises the steps of applying binary signals to the apparatus, applying the signals to an oscilloscope arranged in such a manner as to provide a trace showing the waveform of the signals, differentiating the voltage appearing at the output of the apparatus and applying the differentiated voltage through a rectifier to control the beam current in the cathode ray tube of the oscilloscope, the rectifier being connected so as to conduct in a sense such that the trace is brightened by the differentiated output voltage and hence the trace includes points of increased brilliance indicating the instants of changeover of the binary apparatus. Any suitable signals may be used. The invention may be used with random signals or reversal keying.

According to the present invention apparatus for use in testing binary apparatus comprises a source of binary signals connected to the binary apparatus and to deflection means of a cathode ray tube for deflecting the beam in the cathode ray tube, the cathode ray tube being provided with an associated time base circuit whereby the waveform of the binary signals can be displayed, and means for connecting the output of the binary apparatus through a differentiating network and a rectifier circuit to a control electrode of the cathode ray tube, the arrangement being such that, in operation, the instants of changeover of the binary apparatus are indicated by points of increased brilliance in the display provided by the cathode ray tube.

The invention will now be described by way of example with reference to the accompanying drawing, in which.

Figure 1:
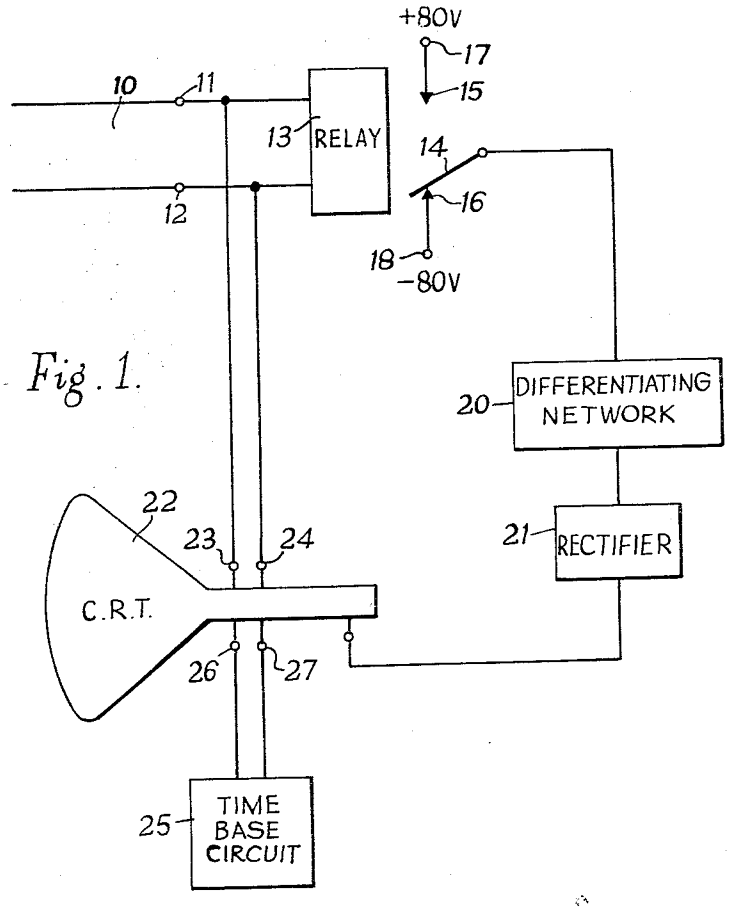
FIG. 1 is a block schematic diagram of one embodiment of the invention.

In FIGURE 1 telegraph signals occurring in a line 10 are applied through two terminals 11 and 12 to the winding 13 of a telegraph relay. The relay has a tongue 14 which moves between two fixed contacts 15 and 16 on operation of the relay. The fixed contact 15 is connected to a terminal 17 at a potential of +80 volts whereas the fixed contact 16 is connected to a terminal 18 at a potential of −80 volts.

Figure 2:
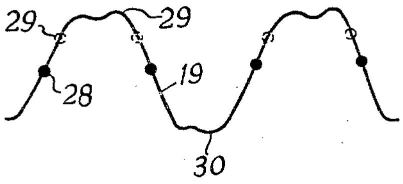
FIG. 2 is an explanatory diagram showing a waveform trace.

The telegraph waveform applied to the input terminals 11 and 12 may be as shown by the waveform at 19 in FIGURE 2. Thus, the tongue 14 moves to the fixed contacts 15 and 16 alternately and hence the potential on the tongue is alternately +80 volts and −80 volts. The waveform appearing at the tongue 14 is differentiated by a differentiating network 20 and hence positive and negative-going voltage spikes are derived at the leading and trailing edges of each pulse in the waveform. The differentiated voltages are applied through a rectifier 21 to the control grid of a cathode ray tube 22 where they serve to increase the beam current, causing a bright-up on the screen of the cathode ray tube. If the rectifier 21 is a half-wave rectifier there will be only one bright-up for each successive pair of reversals, whereas if the rectifier 21 is a full-wave rectifier then there will be a bright-up for each reversal of potential.

The telegraph waveform 19 appearing at the terminals 11 and 12 is also applied to the vertical deflection plates of the cathode ray tube 22 through two input terminals 23 and 24. A time-base circuit 25 is connected through two further terminals 26 and 27 on the cathode ray tube 22 to the horizontal deflection plates of the cathode ray tube and hence a trace of the waveform 19 (FIG. 2) is reproduced on the screen of the cathode ray tube.

In addition, the bright-up voltages applied to the cathode ray tube from the rectifier 21 produce in the waveform 19 of FIG. 2 a brightened spot indicating the instant of reversal of the position of the tongue 14 from one of its fixed contacts to the other.

In the waveform 19 of FIG. 2 there are shown bright-up spots 28 occurring once for each reversal, and hence in this particular embodiment it is assumed that the rectifier 21 provides a positive-going pulse to the control grid of the cathode ray tube on each reversal, whether it be a negative-going reversal or a positive-going reversal.

In FIG. 2 it will be seen that the instant of changeover of the tongue from one of the fixed contacts 15/16 to the other occurs midway between the two extremities 29 and 30 of the waveform applied to the input terminals 11 and 12. Should the relay be biased, however, the position of the bright-up spots shifts accordingly either up or down on the trace, and examples of the bright-up spots so shifted are shown in dotted lines at **28*a* in the waveform 19** of FIG. 2.

It will be understood by those skilled in the art that various kinds of differentiating networks and various kinds of rectifier circuits may be used to derive the required pulses for application to the control grid of the cathode ray tube. For example, the differentiating circuit may consist of a rectifier, a capacitor and a resistor connected in series in the order given, the output being taken across the resistor and the rectifier being so connected as to pass only positive-going impulses to the control electrode of the cathode ray tube.

Where a positive-going pulse is required for application to the cathode ray tube at each transition in the applied waveform the simple circuit just referred to may be replaced by a trigger-pair circuit and the outputs from the anode of both valves in the trigger-pair circuit may be differentiated and rectified before being applied in the positive-going sense to the control electrode of the cathode ray tube to brighten the trace.

Likewise, any suitable time-base circuit may be employed at 25.

Although the invention has been described with reference to a telegraph relay as one example of binary apparatus it will be understood that the invention is equally applicable to other types of binary apparatus. For example, apparatus in data transmission.

We claim:

1. Apparatus for use in testing a telegraph relay having a signals winding and a movable tongue operating between space and mark contacts, said apparatus comprising a source of telegraph signals connected to the winding of the relay for causing the tongue of the relay to changeover between its mark and space contacts, oscillographic means controlled by said binary signals for producing a trace of the wave-form of said signals on a viewing screen, a differentiating network connected to said tongue, and a connection for applying the output of said network to said oscillographic means to effect an increase in brightness of said trace upon operation of said tongue from one contact to the other.

2. Apparatus according to claim 1 wherein said oscillographic means comprises a cathode ray tube oscilloscope having a beam-control electrode, and the output of said differentiating network is connected to said beam-control electrode, said connection including rectifier means for effecting increase in brightness upon movement of said tongue in either direction.

References Cited in the file of this patent

UNITED STATES PATENTS

| | | |
|---|---|---|
| 2,212,634 | Buckingham | Aug. 27, 1940 |
| 2,280,524 | Hansen | Apr. 21, 1942 |
| 2,490,530 | Loughlin | Dec. 6, 1949 |